United States Patent
Kümmlee et al.

(10) Patent No.: US 10,574,101 B2
(45) Date of Patent: Feb. 25, 2020

(54) ROTOR FOR AN ELECTRIC ROTATING MACHINE

(71) Applicant: Siemens Aktiengesellschaft, München (DE)

(72) Inventors: Horst Kümmlee, Berlin (DE); Stefan Schmidt, Bernau OT Schönow (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/093,504

(22) PCT Filed: Feb. 9, 2017

(86) PCT No.: PCT/EP2017/052845
§ 371 (c)(1),
(2) Date: Oct. 12, 2018

(87) PCT Pub. No.: WO2017/178129
PCT Pub. Date: Oct. 19, 2017

(65) Prior Publication Data
US 2019/0363593 A1    Nov. 28, 2019

(30) Foreign Application Priority Data

Apr. 14, 2016  (EP) .................... 16165332

(51) Int. Cl.
*H02K 1/28* (2006.01)
*H02K 1/24* (2006.01)
*H02K 15/02* (2006.01)

(52) U.S. Cl.
CPC ........... *H02K 1/246* (2013.01); *H02K 15/022* (2013.01)

(58) Field of Classification Search
CPC .. H02K 1/24; H02K 1/28; H02K 1/30; H02K 3/527
See application file for complete search history.

(56) References Cited

U.S. PATENT DOCUMENTS 1,450,521 A * 4/1923 Steinbach .............. H02K 21/10
310/269
3,089,049 A    5/1963 Sills
(Continued)

FOREIGN PATENT DOCUMENTS

DE    4415224 A1    11/1995
EP    2876783 A1    5/2015
(Continued)

OTHER PUBLICATIONS

PCT International Search Report and Written Opinion of International Searching Authority dated Mar. 14, 2017 corresponding to PCT International Application No. PCT/EP2017/052845 filed Feb. 9, 2017.
(Continued)

*Primary Examiner* — Dang D Le

(74) *Attorney, Agent, or Firm* — Henry M. Feiereisen LLC

(57) ABSTRACT

A rotor for an electric rotating machine, in particular a synchronous machine, includes a shaft and at least one pole shoe. The shaft has a first contact surface and the at least one pole shoe has a second contact surface. The first contact surface has a first profile and the second contact surface has a second profile corresponding to the first profile, with the first profile of the first contact surface lying on the corresponding second profile of the second contact surface in an interlocking manner.

17 Claims, 9 Drawing Sheets

(56) References Cited

U.S. PATENT DOCUMENTS

| | | | |
|---|---|---|---|
| 3,612,930 A | * | 10/1971 | Raby .................. H02K 1/28 |
| | | | 310/216.087 |
| 4,814,656 A | * | 3/1989 | Lis .................... H02K 3/20 |
| | | | 310/211 |
| 6,933,647 B2 | | 8/2005 | Kümmlee et al. |
| 9,077,223 B2 | | 7/2015 | Imura et al. |
| 9,287,749 B2 | | 3/2016 | Kümmlee |
| 2006/0250037 A1 | | 11/2006 | Kümmlee |
| 2014/0333174 A1 | | 11/2014 | Imura et al. |
| 2016/0380491 A1 | | 12/2016 | Krompasky |
| 2017/0067670 A1 | | 3/2017 | Kümmlee et al. |

FOREIGN PATENT DOCUMENTS

| | | |
|---|---|---|
| RU | 2056694 C1 | 3/1996 |
| SU | 1337966 A1 | 9/1987 |

OTHER PUBLICATIONS

Kümmlee et al., U.S. Pat. No. 9,233,373, Jan. 12, 2016, 2013-0306773, Nov. 21, 2013.

\* cited by examiner

ROTOR FOR AN ELECTRIC ROTATING MACHINE

CROSS-REFERENCES TO RELATED APPLICATIONS

This application is the U.S. National Stage of International Application No. PCT/EP2017/052845, filed Feb. 9, 2017, which designated the United States and has been published as International Publication No. WO 2017/178129 and which claims the priority of European Patent Application, Serial No. 16165332.4, filed Apr. 14, 2016, pursuant to 35 U.S.C. 119(a)-(d).

BACKGROUND OF THE INVENTION

The invention relates to a rotor for an electric rotating machine, in particular a synchronous machine, comprising a shaft and at least one pole shoe, wherein the shaft has a first contact surface and wherein the at least one pole shoe has a second contact surface.

The invention also relates to an electric rotating machine, in particular a synchronous machine, comprising a rotor of said type.

The invention further relates to a method for producing a rotor of said type for an electric rotating machine, in particular a synchronous machine.

A rotor of said type finds application in particular in direct-starting synchronous salient-pole machines with mounted pole shoes. Mounted pole shoes are employed principally in large drives having a power rating of at least 1 megawatt. A separation joint is formed between the pole shoe and the shaft on which the pole shoe is mounted. An asynchronous starting of the synchronous salient-pole machine causes eddy currents to be induced in the mounted pole shoes, the surface of the pole shoes in particular being intensely heated by the eddy currents. In the course of being heated through, the pole shoes expand. The transverse force resulting therefrom in the separation joint is restrained primarily in a friction-locking manner. If the static friction is overcome, a heat-induced relative displacement occurs in the separation joint between pole shoe and shaft. In most cases a relative displacement of said kind happens abruptly and arbitrarily. The mass displacements associated therewith have a negative impact on the equilibrium state of the rotor and consequently on the oscillation behavior.

The pole shoes are preferably connected to the shaft by means of bolts. The static friction in the separation joint between pole shoe and shaft is therefore determined by the pretensioning forces and the coefficients of friction. In particular the coefficients of friction can be influenced by selective changes to the material properties and surface characteristics of the partners in the frictional engagement.

An electrical rotating machine having a salient-pole rotor composed of pole bodies and pole shoes is known from the patent specification U.S. Pat. No. 9,077,223 B2. The pole bodies are integrally formed in a single piece from a shaft, Each pole shoe is fixedly joined to the associated pole body by means of a plurality of bolts. When a pole shoe is fastened to the corresponding pole body with the aid of the bolts, a cone-shaped compression region is produced in the vicinity of the compression surface.

Each pole shoe or its corresponding pole body has at least one projection or recess in order to delimit the cone-shaped compression region in the vicinity of the compression surface.

An electric machine having a pole wheel comprising a plurality of poles is known from laid-open publication DE 44 15 224 A1, there being provided for each pole in said electric machine a pole body connected in a single piece to a yoke and having a field excitation winding surrounding the same and a pole shoe arrangement fastened to the end of the pole body by means of bolts. The intended aim with this construction is to provide a more effective means of intercepting the centrifugal forces occurring during the rotation of the pole wheel and acting on the pole shoe arrangement and the field excitation winding. For this purpose, the pole shoe arrangement comprises a retaining plate bolted onto the pole body and a pole shoe bolted solely to the retaining plate. The centrifugal forces occurring due to the field excitation winding are therefore intercepted by the retaining plate.

The laid-open publication US 2014/0333174 A1 describes an electric rotating machine comprising a salient-pole rotor that is composed of pole bodies. The pole bodies are integrally formed in a single piece from a shaft. The pole shoes form pole heads. Each pole shoe is fixedly connected to the associated pole body by means of a plurality of bolts. Each pole shoe or its corresponding pole body has at least one projection or recess in order to delimit a cone-shaped compression region in a compression zone. A cone-shaped compression region in a compression zone occurs when the pole shoe is connected to the corresponding pole body by means of the bolts.

The laid-open publication U.S. Pat. No. 3,089,049 A describes a salient-pole rotor comprising pole bodies and pole shoes, the pole bodies being releasably connected to the pole shoes by way of an integral construction.

The laid-open publication EP 2 876 783 A1 describes a salient-pole rotor comprising at least two radially outward facing pole bodies, each having a respective pole shoe, the pole shoe being wider in the circumferential direction than the respective pole body. The respective pole shoe has a radially inward facing, tapering projection, the respective pole body having, on its radial outer surface, a radially inwardly tapering groove complementary to the respective projection, the respective pole shoe and the respective pole body being connected in a mechanically releasable manner.

The object underlying the invention is to disclose a rotor for an electric rotating machine which, in comparison with the prior art, possesses a higher level of reliability and at the same time is easy and cost-effective to produce.

SUMMARY OF THE INVENTION

This object is achieved according to the invention by means of a rotor for an electric rotating machine, in particular a synchronous machine, comprising a shaft and at least one pole shoe, the shaft having a first contact surface, the at least one pole shoe having a second contact surface, the first contact surface having a first profile and the second contact surface having a second profile corresponding to the first profile, the first profile of the first contact surface bearing on the corresponding second profile of the second contact surface in a positive, interlocking manner, a variation in height of the respective contact surfaces being present at least in an axial direction due to the profiles, the respective profile having toothed racks and/or toothed rack slots or the respective profile having truncated pyramids and/or truncated pyramid slots.

The object is also achieved by means of an electric rotating machine, in particular a synchronous machine, comprising a rotor of said type.

The object is further achieved by means of a method for producing a rotor of said type for an electric rotating machine, in particular a synchronous machine.

The advantages and preferred embodiments cited below in relation to the rotor can be applied analogously to the electric rotating machine and the production method.

A profile of said type (the profile is also referred to in the following as a free-form profile) has in particular, referred to a plane of reference, elevations and depressions. A second profile corresponding to the first profile is equivalent to the counterpart matching the first profile. For example, an interlocking fit between the contact surfaces is produced as a result of the two complementary profiles engaging into contact with one another. A free-form profile of said type offers the advantage that the connection between pole shoe and shaft can be freely dimensioned. By means of the two complementary profiles, in particular a positive transmission of force is achieved at least in the transverse force direction. A heat-induced relative displacement between the pole shoe and the shaft is avoided as a result of a positive-locking connection of said type. For this reason, a more stable oscillation behavior is achieved, thus leading to an improved reliability of the rotor, in particular in operation with asynchronous starting. Furthermore, the free-form profile requires no additional connecting elements. The rotor is therefore simple and cost-effective to produce.

As a result of the profiles, a variation in height of the respective contact surfaces is present at least in an axial direction. The variation in height lies in particular in the millimeter to centimeter range. Such a variation in height, at least in the axial direction, results in a positive transmission of force in the axial direction, thereby avoiding a heat-induced relative displacement between pole shoe and shaft, at least in the axial direction, in particular during operation with asynchronous starting.

The respective profile has toothed racks and/or toothed rack slots or else truncated pyramids and/or truncated pyramid slots.

A toothed rack is in particular an elevation having two sloping side faces and a plane tooth surface disposed between the two sloping side faces. A toothed rack slot is the inverse counterpart to the toothed rack. A profile having toothed racks and toothed rack slots has proven to be particularly robust.

A truncated pyramid is in particular an elevation having four sloping side faces and a plane truncated pyramid surface disposed between the four sloping side faces. A truncated pyramid slot is the inverse counterpart to the truncated pyramid. A profile of said type results in a positive transmission of transverse force in the axial direction and the tangential direction.

In a preferred embodiment variant, the profiles extend substantially over the entire axial length of the respective contact surface. A separation joint is disposed between the first contact surface of the shaft and the second contact surface of a pole shoe which bears on the shaft. The force can be transmitted, at least in the axial direction, substantially over the entire surface area of the separation joint. The positive transmission of force is optimized as a result of a planar profile of said type.

Preferably, the profiles have sloping side faces, the first contact surface engaging in contact with the second contact surface in the region of the sloping side faces. Thanks to the sloping side faces, the profiles engage in contact with one another, for example by means of an interlocking fit, in a play-free manner without any need for a complex joining process, such as clamping, force fitting or a joint machining of components, for example. A backlash-free transmission of force is achieved with low manufacturing overhead as a result of the profiles having sloping side faces.

In a further advantageous embodiment, the sloping side faces of the first profile extend substantially parallel to the sloping side faces of the second profile and the first contact surface bears over its entire area on the second contact surface in the region of the sloping side faces. In this way, the bearing area between the first contact surface and the second contact surface is maximized.

In an advantageous embodiment, cavities are formed at certain points between the first contact surface and the second contact surface. During an asynchronous start, the pole shoes in particular heat up and expand due to the heat. As a result, the material is able to expand in the cavities and the positive-locking fit is ensured even at high temperatures.

Preferably, the respective profile is implemented as substantially redundant, at least in the axial direction. The elevations and depressions of a redundant profile have in particular the same shape, the same size and/or the same spacing from one another. This leads to a uniform transmission of transverse force on the surface. Furthermore, a redundant profile can be produced easily and cost-effectively.

Beneficially, at least parts of the first contact surface and/or of the second contact surface have a surface roughness of more than 25 μm. A surface roughness of said type can be achieved by abrasive blasting, for example. Increasing the surface roughness leads to an increase in the coefficient of static friction between the contact surfaces, thus making it even more difficult for a relative displacement to occur.

Beneficially, the toothed racks have substantially the shape of a trapezoid, in particular an equilateral trapezoid, in cross-section. A profile of said type has been proven by experience to be particularly advantageous.

BRIEF DESCRIPTION OF THE DRAWING

The invention is described and explained in more detail below with reference to the exemplary embodiments illustrated in the figures, in which.

DETAILED DESCRIPTION OF PREFERRED EMBODIMENTS

Like reference signs have the same meaning throughout the various figures.

Figure 1:
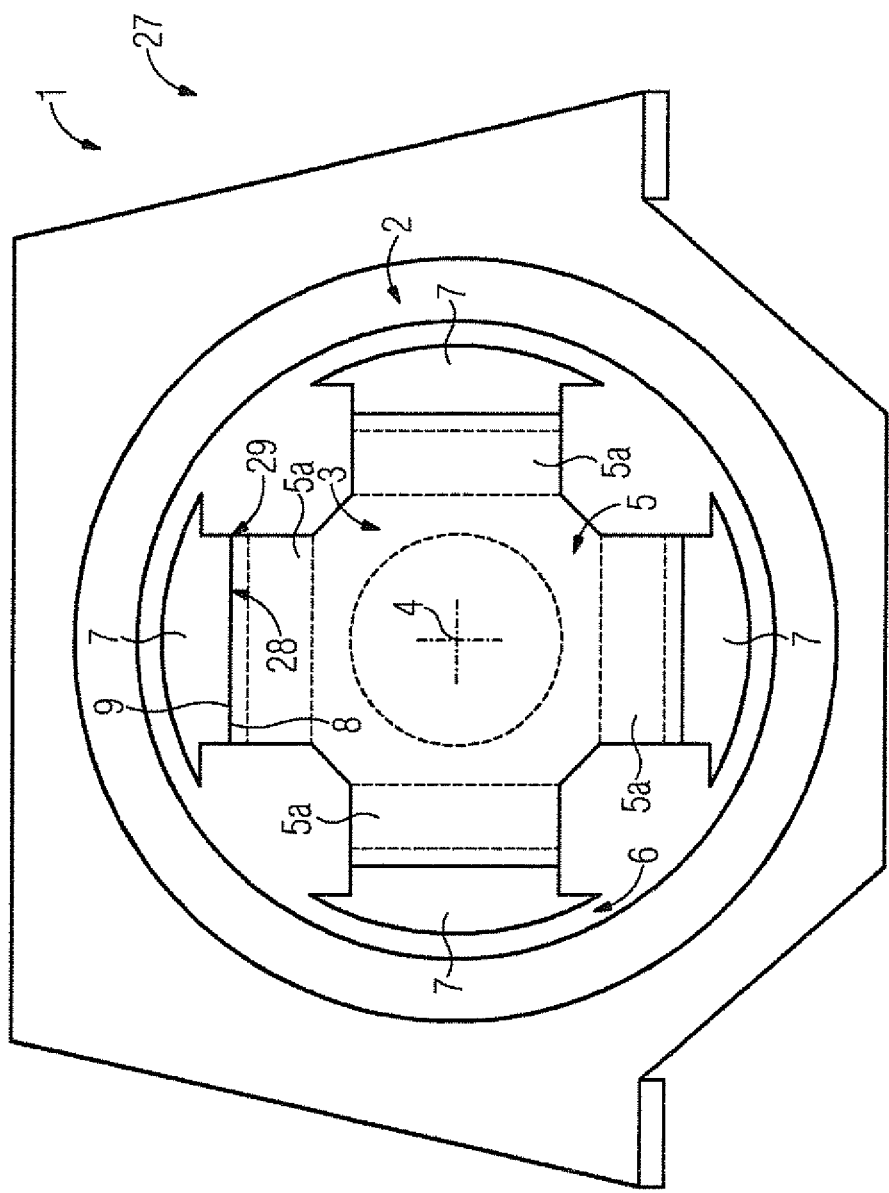
FIG. 1 shows a cross-section through an electric rotating machine.

FIG. 1 shows a cross-section through an electric rotating machine 1.

The electric rotating machine 1 is embodied as a direct-starting synchronous machine 27 and comprises a rotor 3 that is rotatable about an axis of rotation 4 and a stator 2 surrounding the rotor 3, an air gap 6 being present between the rotor 3 and the stator 2. The synchronous machine 27 is capable of operating at a power rating of at least 1 megawatt. For clarity of illustration reasons, the coils of the stator 2 and of the rotor 3 are not shown.

The rotor 3 of the direct-starting synchronous machine 27 has a shaft 5 comprising, by way of example, four orthogonally arranged salient poles 5a, the salient poles 5 being provided with pole shoes 7. The shaft 5 and the pole shoes 7 consist of a soft-magnetic steel, in particular a tempering steel, embodied as a solid material. The pole shoes 7 are bolted onto the shaft 5 with the aid of connecting elements 19 embodied in the form of bolts (see FIG. 11). For clarity of illustration reasons, the bolts 16 are not depicted in FIG. 1.

Each salient pole 5a of the shaft 5 has a first contact surface 8 and each pole shoe 7 has a second contact surface 9. The shaft 5 is engaged in contact with the second contact surface 9 of the pole shoes 7 via a first contact surface 8. The first contact surface 8 has a first profile 28 and the second contact surface 9 has a second profile 29 corresponding to the first profile 28 (the profile is also referred to in the following as a free-form profile). The first contact surface 8 is engaged in contact with the second contact surface 9 by means of the first profile 28 and the corresponding second profile 29 in such a way that a positive-locking connection exists between the first contact surface 8 and the second contact surface 9. In this arrangement, the variation in height of the profiles 28, 29 lies in the millimeter to centimeter range in each case.

A positive transmission of force in the transverse force direction is achieved by means of the two complementary free-form profiles 28, 29. A heat-induced relative displacement between the pole shoe 7 and the shaft 5, which is caused in particular by eddy currents induced in the pole shoe 7 during an asynchronous start, is avoided by means of a positive-locking connection of said type. The free-form profiles 28, 29 can be used as a substitute for or supplement to a frictional transmission of force. To provide a frictional transmission of force of said type, at least parts of the first contact surface 8 and/or of the second contact surface 9 have a surface roughness of more than 25 μm. Such a surface roughness can be achieved by abrasive blasting, for example.

Different embodiment variants of the profiles 28, 29 of the contact surfaces 8, 9 of the shaft and the pole shoe 7 of a rotor 3 of said type are illustrated in the following figures and are described and explained in more detail below.

Figure 2:
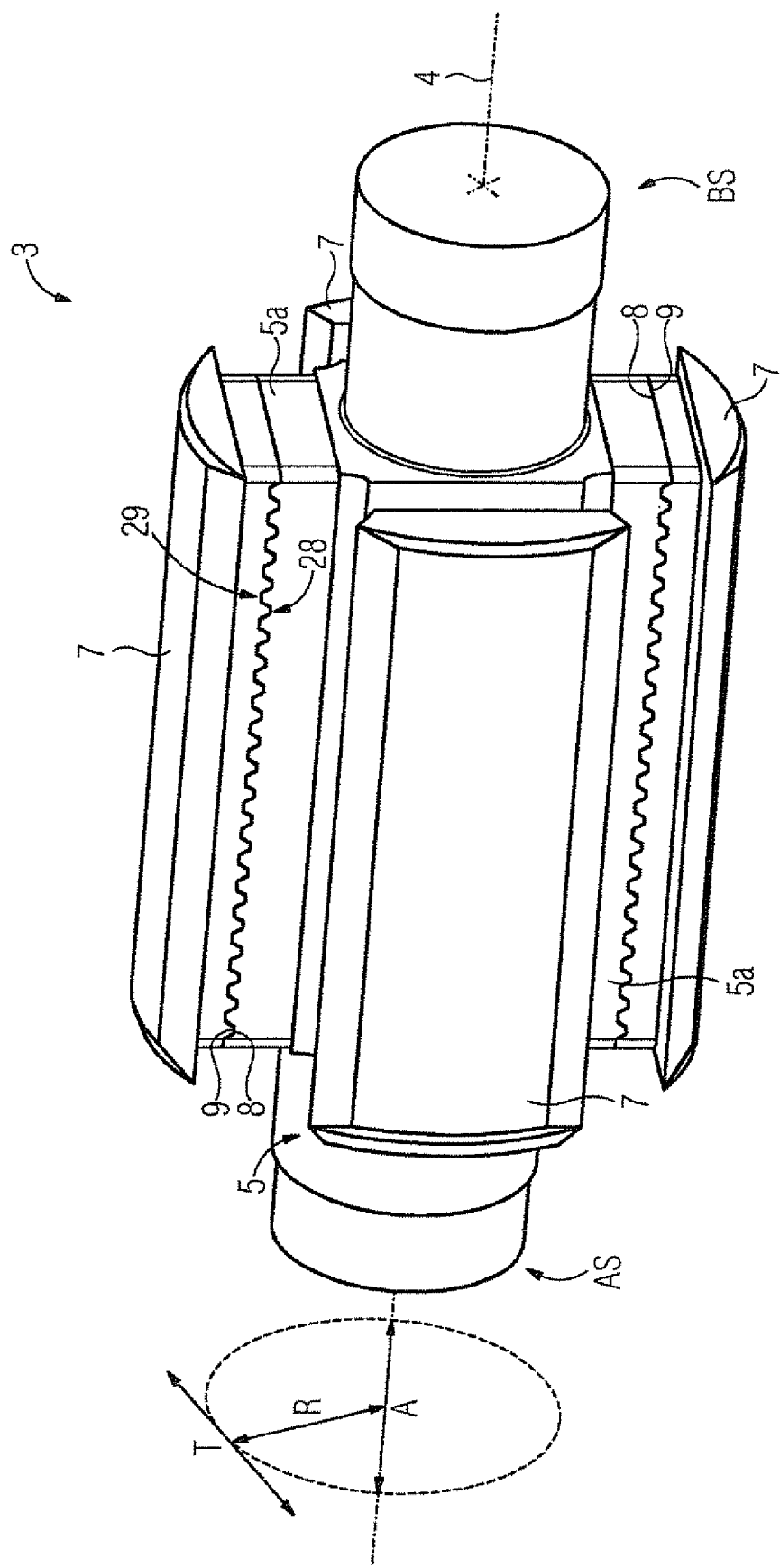
FIG. 2 shows a perspective view of a first embodiment variant of a rotor.

FIG. 2 shows a perspective view of a first embodiment variant of a rotor 3. The rotor 3 is rotatable about an axis of rotation 4, the axis of rotation 4 defining an axial direction A, a radial direction R and a tangential direction T. The rotor 3 has a driving end AS and a non-driving end BS. As shown in FIG. 1, the first contact surface 8 of the shaft 5 is engaged in a positive-locking connection with the second contact surface 9 of the pole shoes 7 by means of a first profile 28 and a corresponding second profile 29.

The profiles 28, 29, which are implemented by means of a variation in height of the respective contact surfaces 8, 9, extend over the entire axial length of the contact surfaces 8, 9 and are embodied in a redundant arrangement. By a redundant embodiment is to be understood in the present context that the elevations and depressions of the profiles 28, 29 have the same shape, the same height, the same width and the same spacing from one another. The further embodiment of the rotor 3 corresponds to that from FIG. 1.

Figure 3:
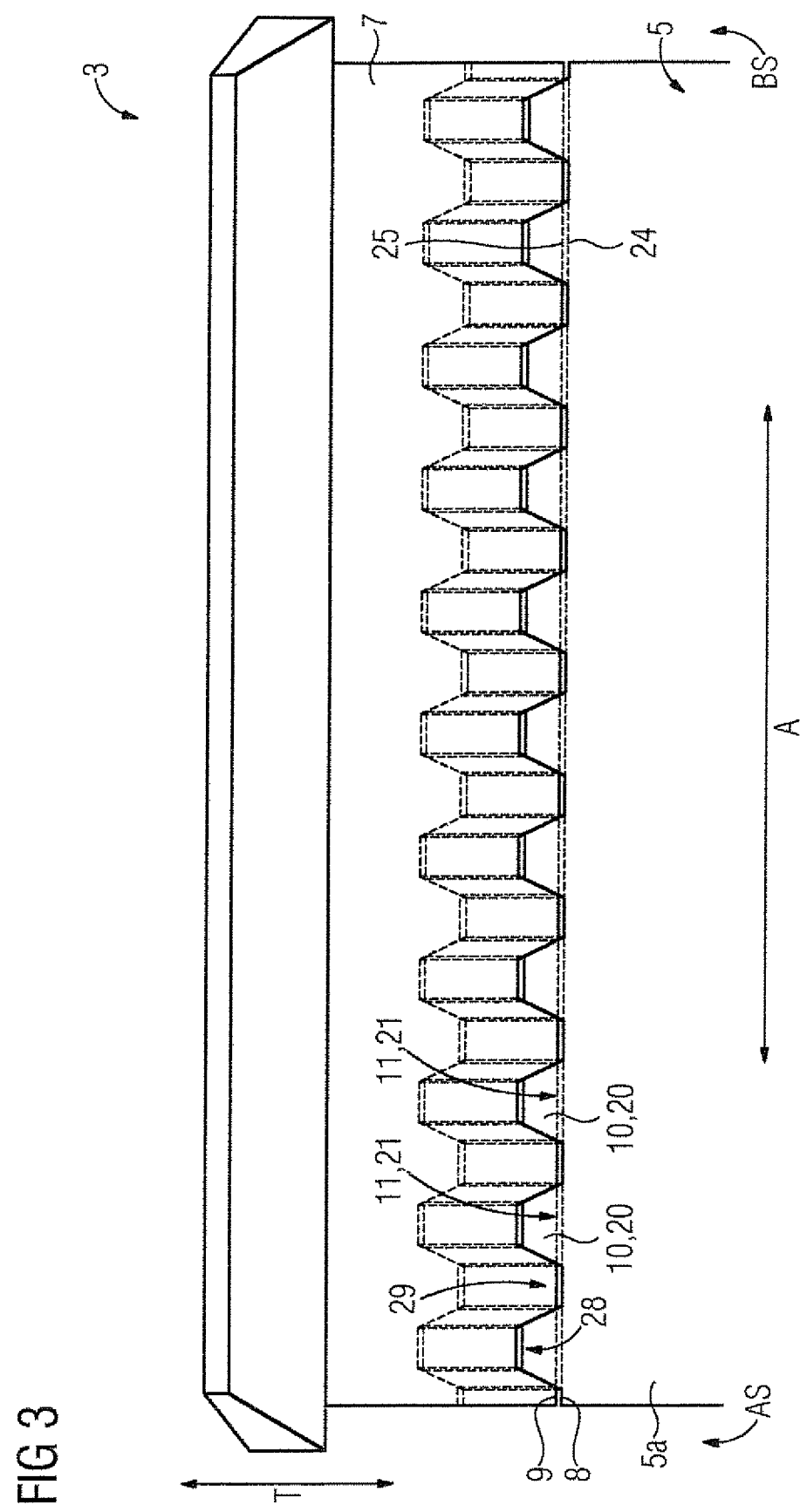
FIG. 3 shows an enlarged side view of a rotor in the region of a pole shoe having a first embodiment variant of a profile.

FIG. 3 shows an enlarged side view of a rotor 3 in the region of a pole shoe 7 having a first embodiment variant of a profile 28, 29. The profiles 28, 29 extend over the entire axial length of the contact surfaces 8, 9 and are embodied by means of toothed racks 20 and toothed rack slots 21 corresponding to the toothed racks 20, the toothed racks 20 and toothed rack slots 21 extending in the tangential direction T. The toothed racks 20 are located by way of example on the first contact surface 8 of the shaft 5 and the corresponding toothed rack slots 21 are located on the second contact surface 9 of the pole shoe 7.

The toothed racks 20 are elevations 10 with respect to a first plane of reference 24 of the second contact surface 9 which have a trapezoidal cross-section and are embodied in particular in an identical manner and which are arranged on the first contact surface 8 preferably at equal spacings in the axial direction A. The toothed rack slots 21 are depressions 11 with respect to a second plane of reference 25 of the first contact surface 8 which are arranged on the second contact surface 9 in complementary relationship to the toothed rack slots 20. Referred to the respective plane of reference 24, 25, the toothed racks 20 have a constant height and the toothed rack slots 21 a constant depth in the tangential direction T. The dimensioning of the toothed racks 20 and of the toothed rack slots 21 corresponding thereto, as well as of their axial spacings, is determined based on the transverse force loading and the contact pressure per unit area resulting therefrom. Referred to their plane of reference 24, 25, the height of the toothed racks 20 and the depth of the toothed rack slots 21 lie in the millimeter to centimeter range in each case. The remaining embodiment of the rotor 3 corresponds to that from FIG. 2.

Figure 4:
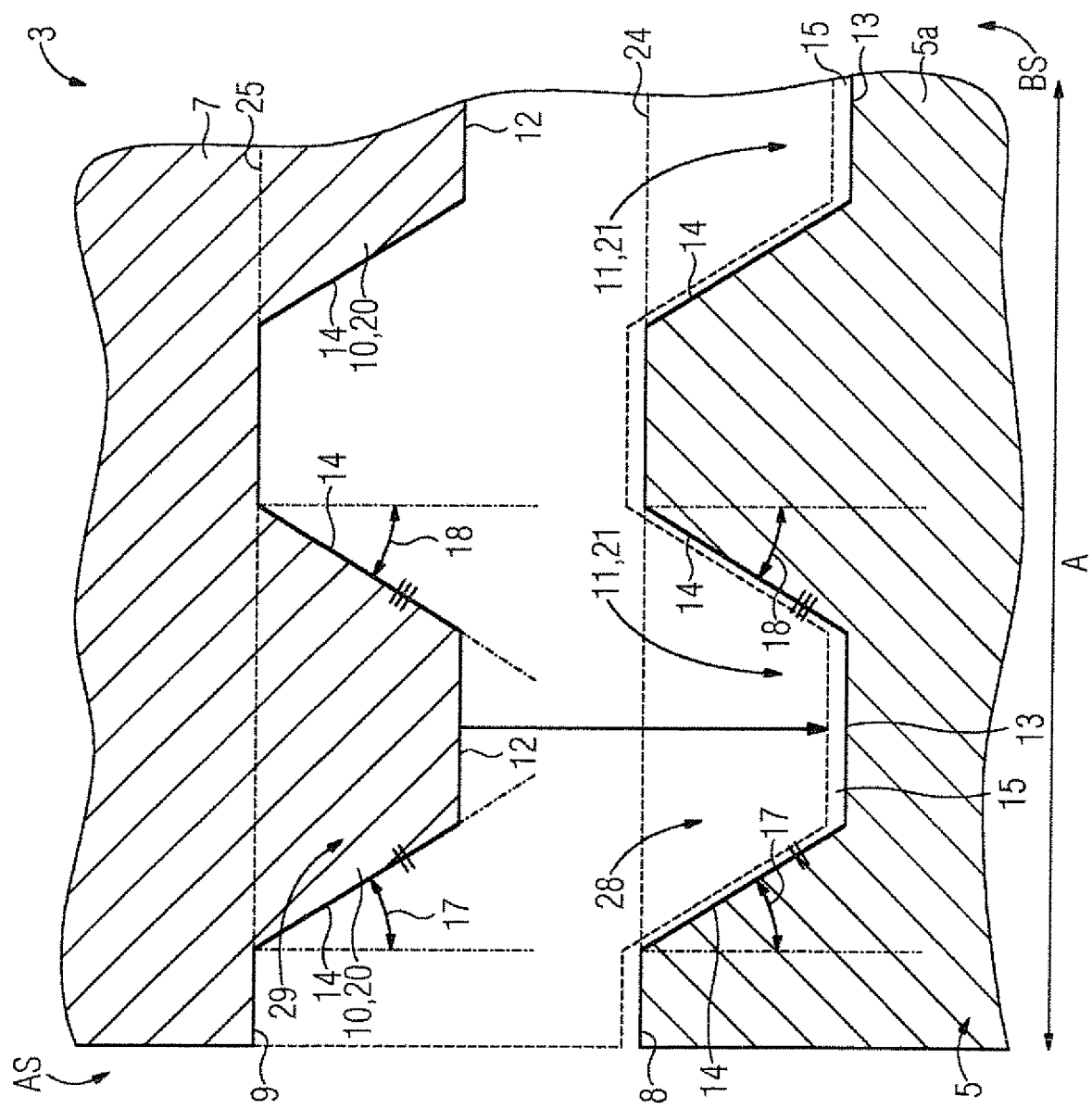
FIG. 4 shows an enlarged longitudinal section through the rotor in the region of a pole shoe according to FIG. 3.

FIG. 4 shows an enlarged longitudinal section through the rotor 3 in the region of a pole shoe 7 according to FIG. 3. The toothed racks 20 and toothed rack slots 21 described in FIG. 3 are depicted in greater detail in FIG. 4, the toothed racks 20 being located by way of example on the second contact surface 9 of the pole shoe 7 and the corresponding toothed rack slots 21 on the first contact surface 8 of the shaft 5. The toothed racks 20 have a cross-section corresponding to an equilateral trapezoid, each toothed rack 20 having two side faces 14 and a tooth surface 12 disposed between the two side faces 14. Referred to the first plane of reference 24, the corresponding toothed rack slots 21 form depressions 11, the cross-section of which likewise corresponds to an equilateral trapezoid. Each toothed rack slot 21 has two side faces 14 and a slot surface 13 disposed between the two side faces 14.

The sloping side faces 14 of the toothed racks 20 extend parallel to the sloping side faces 14 of the associated toothed rack slots 21, the first contact surface 8 in the region of the sloping side faces 14 bearing on the second contact surface 9 substantially over its entire area.

The side faces 14 of the toothed racks 20 and toothed rack slots 21 in each case include a first angle 17 and a second angle 18. In order to avoid relative displacements between pole shoe 7 and shaft 5, the contact engagement between the profiles 28, 29 is designed to be free of play. It is therefore advantageous if the angles 17, 18 lie in the range of 10° to 50°. In the case of side faces 14 standing perpendicularly to the transverse force direction, a more complex joining process is required in order to ensure the freedom from play. If the cross-sectional area of the toothed racks 20 and toothed rack slots 21 corresponds to an equilateral trapezoid, the first angle 17 and the second angle 18 are of equal size. Given angles of equal size, the positive transmission of transverse force is identical in the direction of the driving end AS and in the direction of the non-driving end BS.

Cavities 15 are located between the first contact surface 8 and the second contact surface 9 in the region of the tooth surfaces 12 and slot surfaces 13. The soft-magnetic steel used is able to expand in the cavities 15 if the pole shoes 7 in particular heat up during an asynchronous start and expand as a result. The remaining embodiment of the rotor 3 corresponds to that from FIG. 2 and FIG. 3.

Figure 5:
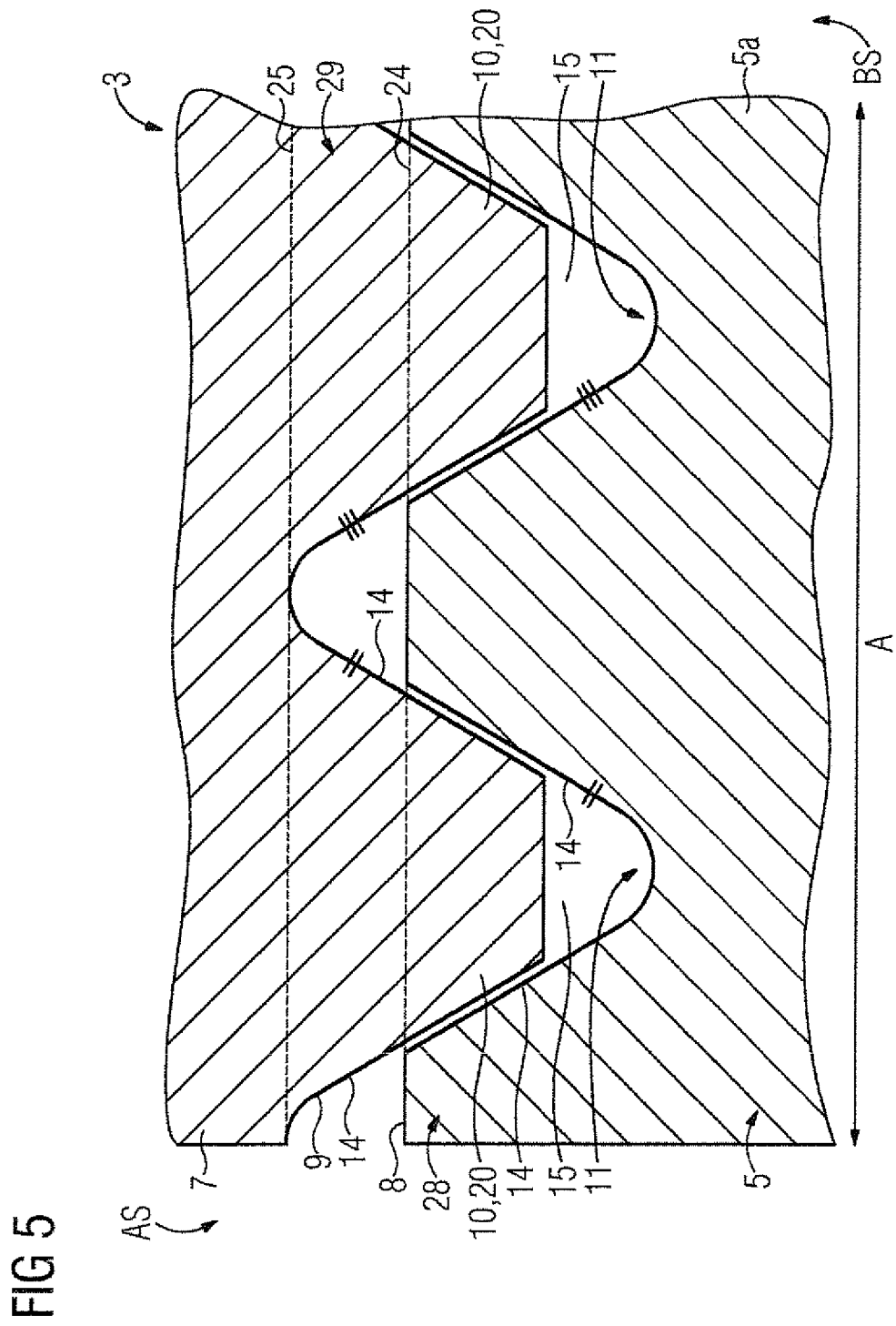
FIG. 5 shows an enlarged longitudinal section through a rotor in the region of a pole shoe having a second embodiment variant of a profile.

FIG. 5 shows an enlarged longitudinal section through a rotor 3 in the region of a pole shoe 7 having a second embodiment variant of a profile 28, 29. Compared to FIG. 4, the depressions 11 are implemented with a rounded contour, as a result of which a larger cavity 15 is formed between the contact surfaces 8, 9 compared to FIG. 4. Other embodiments of the elevations 10 and depressions 11 of the free-form profile 28, 29 in which the first contact surface 8 bears on the second contact surface 9 substantially over its entire area in the region of the sloping side faces 14 are conceivable and belong to the subject matter of the invention. The remaining embodiment of the rotor 3 corresponds to that from FIG. 4.

Figure 6:
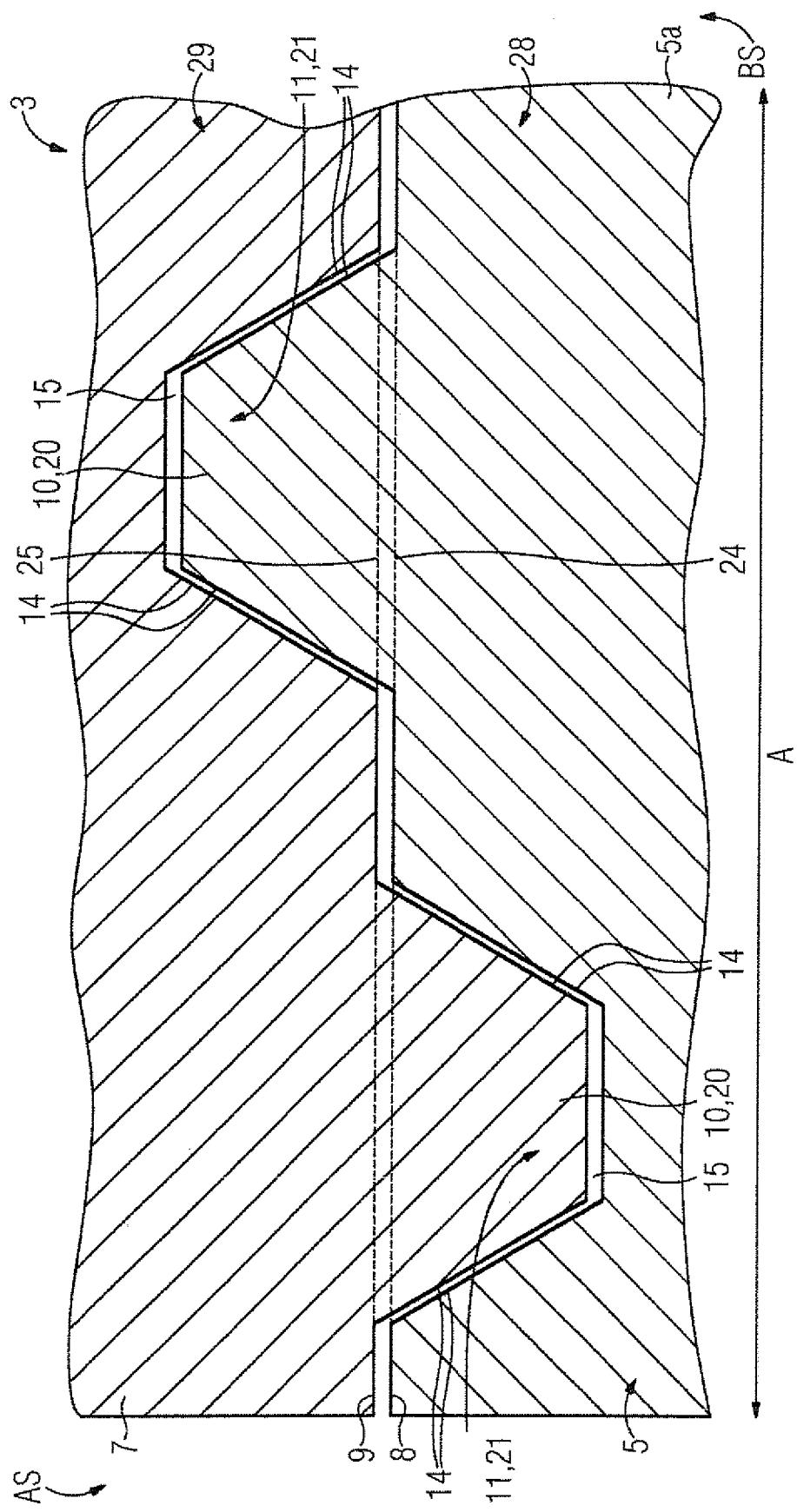
FIG. 6 shows an enlarged longitudinal section through a rotor in the region of a pole shoe having a third embodiment variant of a profile.

FIG. 6 shows an enlarged longitudinal section through a rotor 3 in the region of a pole shoe 7 having a third embodiment variant of a profile 28, 29. Compared to FIG. 4, elevations 10 embodied as toothed racks 20 and depressions 11 embodied as toothed rack slots 21 corresponding to the elevations 10 are located both on the first contact surface 8 of the shaft 5 and on the second contact surface 9 of the pole shoe 7. For example, the elevations 10 and depressions 11 are disposed in an alternating arrangement on the first contact surface 8 and on the second contact surface 9. Other embodiments of the elevations 10 and depressions 11 of the free-form profile 28, 29 in which the first contact surface 8 bears on the second contact surface 9 substantially over its entire area in the region of the sloping side faces 14, as well as different variants of their arrangement, are conceivable and belong to the subject matter of the invention. The remaining embodiment of the rotor 3 corresponds to that from FIG. 4.

Figure 7:
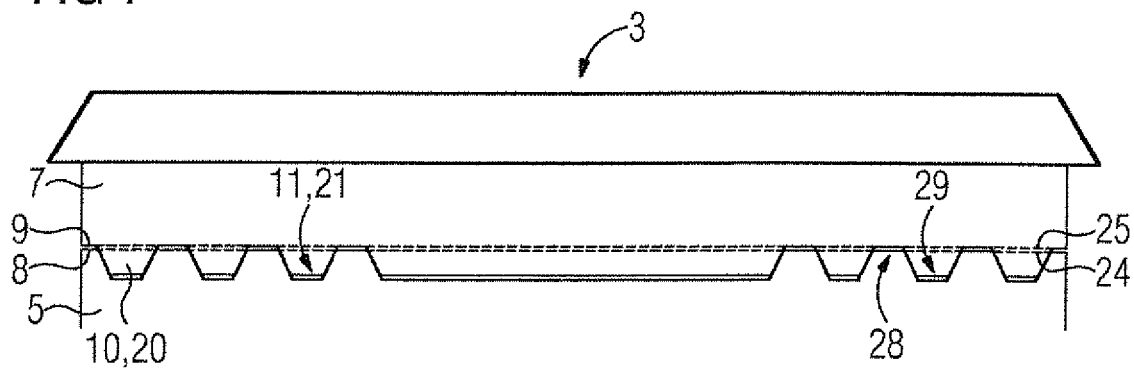
FIG. 7 shows an enlarged longitudinal section through a rotor in the region of a pole shoe having a fourth embodiment variant of a profile.

FIG. 7 shows an enlarged longitudinal section through a rotor 3 in the region of a pole shoe 7 having a fourth embodiment variant of a profile 28, 29, the profiles 28, 29 extending only over a portion of the axial length of the respective contact surface 8, 9. The elevations 10 embodied as toothed racks 20 and the depressions 11 embodied as toothed rack slots 21 corresponding to the elevations 10 are arranged substantially at the axial ends of the respective contact surfaces 8, 9. The remaining embodiment of the rotor 3 corresponds to that from FIG. 4.

Figure 8:
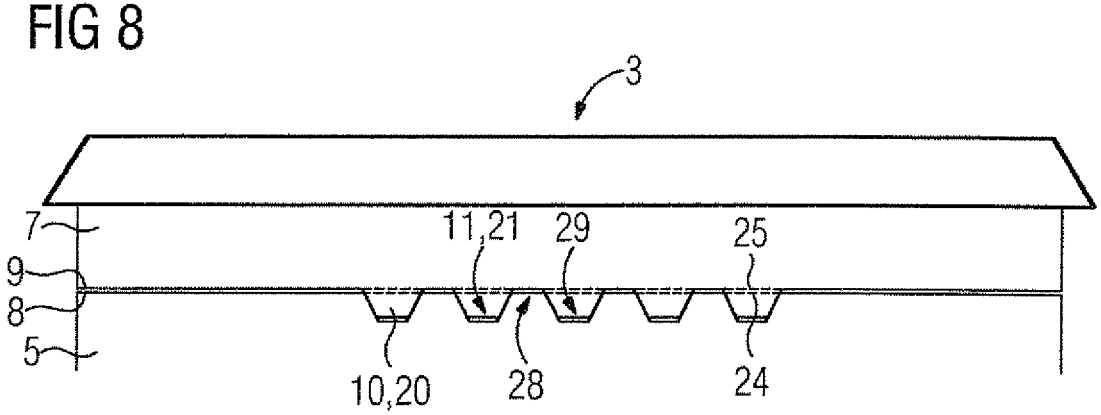
FIG. 8 shows an enlarged longitudinal section through a rotor in the region of a pole shoe having a fifth embodiment variant of a profile.

FIG. 8 shows an enlarged longitudinal section through a rotor 3 in the region of a pole shoe 7 having a fifth embodiment variant of a profile 28, 29, the profiles 28, 29 extending, in similar fashion to that shown in FIG. 7, only over a portion of the axial length of the respective contact surface 8, 9. The elevations 10 embodied as toothed racks 20 and the depressions 11 embodied as toothed rack slots 21 corresponding to the elevations 10 are arranged substantially axially centrally. The remaining embodiment of the rotor 3 corresponds to that from FIG. 4.

Figure 9:
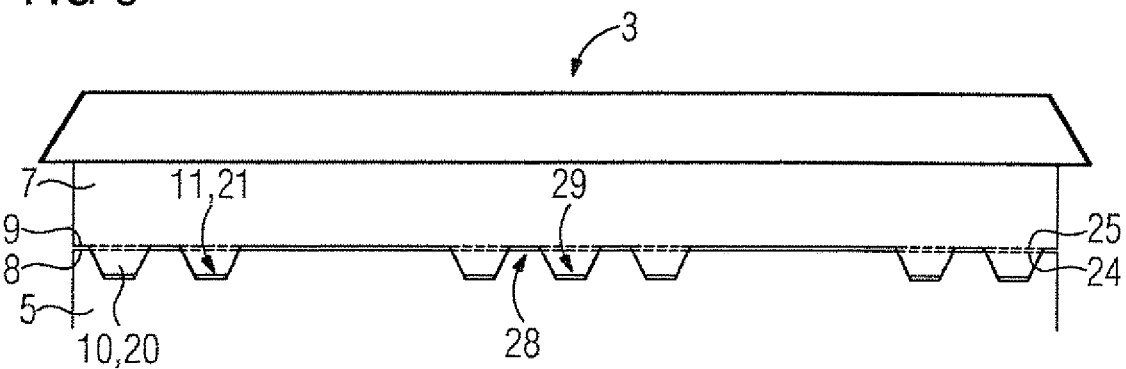
FIG. 9 shows an enlarged longitudinal section through a rotor in the region of a pole shoe having a sixth embodiment variant of a profile.

FIG. 9 shows an enlarged longitudinal section through a rotor 3 in the region of a pole shoe 7 having a sixth embodiment variant of a profile 28, 29, the profiles 28, 29, in similar fashion to that shown in FIG. 7 and FIG. 8, extending only over a portion of the axial length of the respective contact surface 8, 9. The elevations 10 embodied as toothed racks 20 and the depressions 11 embodied as toothed rack slots 21 corresponding to the elevations 10 are arranged substantially at the axial ends of the respective contact surfaces 8, 9 as well as axially centrally. The remaining embodiment of the rotor 3 corresponds to that from FIG. 4.

Figure 10:
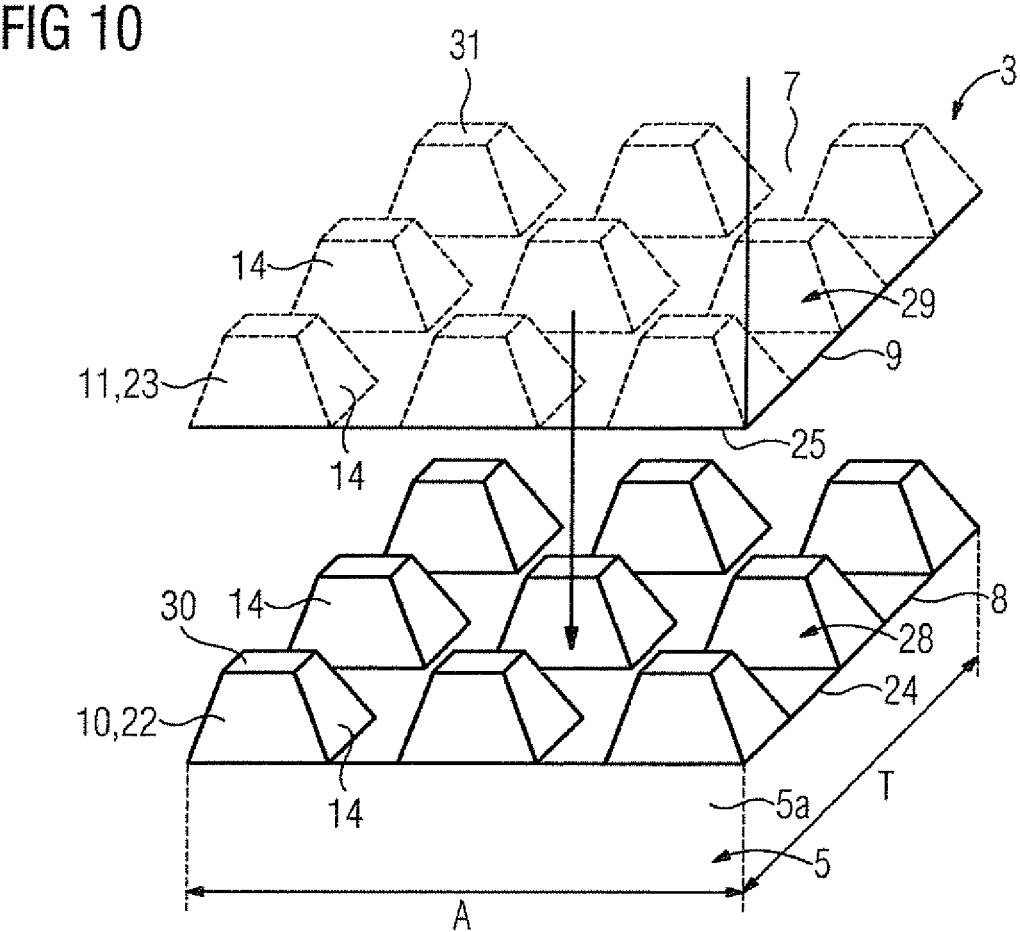
FIG. 10 shows an enlarged perspective view of a rotor in the region of a pole shoe having a seventh embodiment variant of a profile.

FIG. 10 shows an enlarged perspective view of a rotor 3 in the region of a pole shoe 7 having a seventh embodiment variant of a profile 28, 29. The profiles 28, 29 extend over the entire axial and tangential length of the contact surfaces 8, 9. The first profile 28 on the first contact surface of the shaft 5 has, by way of example, elevations 10, referred to a first plane of reference 24. The second profile 29 on the second contact surface 9 of the pole shoe 7 has depressions 11 complementary thereto, referred to a second plane of reference 25. The elevations 10 are embodied as truncated pyramids 22 and the depressions 11 as truncated pyramid slots 23 corresponding to the truncated pyramids 22.

Profiles 28, 29 of said type enable a positive transmission of transverse force to take place in the axial direction A and the tangential direction T. Referred to their plane of reference 24, 25, the height of the truncated pyramids 22 and the depth of the truncated pyramid slots 23 lie in the millimeter to centimeter range in each case.

The truncated pyramids 22 and corresponding truncated pyramid slots 23 each have four sloping side faces 14. Further embodiments of the elevations 10 and depressions 11 in which the first contact surface 8 bears on the second contact surface 9 substantially over its entire area in the region of the sloping side faces 14 are conceivable and belong to the subject matter of the invention.

Figure 11:
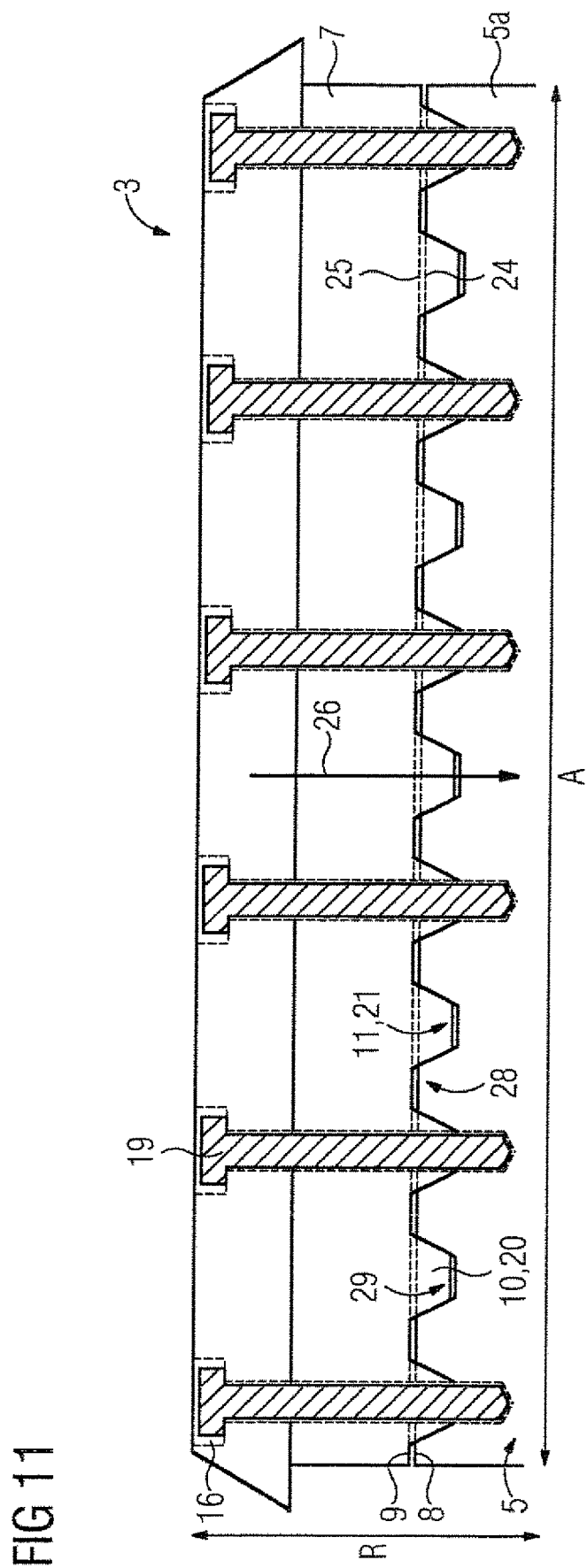
FIG. 11 shows a longitudinal section through a rotor having connecting elements.

FIG. 11 shows a longitudinal section through a rotor 3 in the region of a pole shoe 7 having connecting elements 19. The pole shoe 7 and the shaft 5 have drilled holes 16 in which connecting elements 19 embodied as bolts extend through the pole shoe 7 and the shaft 5 in the radial direction R. The pole shoe 7 is fastened on the shaft 5 with a contact pressure 26 by means of the bolts 19. The bolts 19 or other connecting elements 19 such as cylinder studs permit a positive fit with punctiform contact only. Because the transverse forces occurring in connection with a thermal expansion are very high in most cases, a large number of such connecting elements 19 and/or correspondingly large cross-sections are required. However, the space for additional connecting elements 19 is limited, since further connecting elements are required in particular for containing the centrifugal forces acting during operation. A free-form profile 18, 19 requires no additional connecting elements. Thanks to the positive-locking connection of the first contact surface 8 to the second contact surface 9 over the entire area, a displacement of the contact surfaces 8, 9 with respect to one another is avoided and as a result a more stable oscillation behavior is achieved.

The invention claimed is:

1. A rotor for an electric rotating machine, in particular a synchronous machine, said rotor comprising:
   a shaft including a first contact surface having a profile; and
   a pole shoe including a second contact surface having a profile configured to correspond to the profile of the first contact surface, said profile of the first contact surface bearing on the profile of the second contact surface in a positive, interlocking manner such as to establish a variation in height of the first and second contact surfaces in an axial direction,
   wherein one member selected from the group consisting of the profile of the first contact surface and the profile of the second contact surface includes a toothed rack, and another member of the group includes a toothed rack slot, or
   wherein one member selected from the group consisting of the profile of the first contact surface and the profile of the second contact surface includes a truncated pyramid, and another member of the group includes a truncated pyramid slot.

2. The rotor of claim 1, wherein the profile of the first contact surface is sized to extend substantially over an entire axial length of the first contact surface, and the profile of the second contact surface is sized to extend substantially over an entire axial length of the second contact surface.

3. The rotor of claim 1, wherein the profiles of the first and second contact surfaces have sloping side faces, with the first contact surface contacting the second contact surface in a region of the sloping side faces.

4. The rotor of claim 3, wherein the sloping side faces of the profile of the first contact surface extend substantially parallel to the sloping side faces of the profile of the second contact surface, said first contact surface bearing on the second contact surface over an entire area in the region of the sloping side faces.

5. The rotor of claim 1, wherein cavities are formed between the first contact surface and the second contact surface.

6. The rotor of claim 1, wherein each of the profiles of the first and second contact surfaces is embodied as substantially redundant in the axial direction.

7. The rotor of claim 1, wherein at least one of the first and second contact surfaces has a surface area with a surface roughness of more than 25 μm.

8. The rotor of claim 1, wherein the toothed rack has a cross section substantially in a shape of a trapezoid, in particular an equilateral trapezoid.

9. An electric rotating machine, in particular a synchronous machine, comprising a rotor comprising a shaft including a first contact surface having a profile, and a pole shoe including a second contact surface having a profile configured to correspond to the profile of the first contact surface, said profile of the first contact surface bearing on the profile of the second contact surface in a positive, interlocking manner such as to establish a variation in height of the first and second contact surfaces in an axial direction, wherein one member selected from the group consisting of the profile of the first contact surface and the profile of the second contact surface includes a toothed rack, and another member of the group includes a toothed rack slot, or wherein one member selected from the group consisting of the profile of the first contact surface and the profile of the second contact surface includes a truncated pyramid, and another member of the group includes a truncated pyramid slot.

10. A method for producing a rotor for an electric rotating machine, in particular a synchronous machine, said method comprising:
    configuring a first contact surface of a shaft with a profile;
    configuring a second contact surface of a pole shoe with a profile in correspondence to the profile of the first contact surface;
    bearing the profile of the first contact surface on the profile of the second contact surface in a positive, interlocking manner such as to establish a variation in height of the first and second contact surfaces in an axial direction,
    wherein one member selected from the group consisting of the profile of the first contact surface and the profile of the second contact surface includes a toothed rack, and another member of the group includes a toothed rack slot, or wherein one member selected from the group consisting of the profile of the first contact surface and the profile of the second contact surface includes a truncated pyramid, and another member of the group includes a truncated pyramid slot.

11. The method of claim 10, further comprising sizing the profile of the first contact surface to extend substantially over an entire axial length of the first contact surface, and sizing the profile of the second contact surface to extend substantially over an entire axial length of the second contact surface.

12. The method of claim 10, further comprising forming the profiles of the first and second contact surfaces with sloping side faces, and placing the first and second contact surfaces such that the first contact surface contacts the second contact surface in a region of the sloping side faces.

13. The method of claim 12, wherein the sloping side faces of the profile of the first contact surface extend substantially parallel to the sloping side faces of the profile of the second contact surface, with the first contact surface bearing on the second contact surface over an entire area in the region of the sloping side faces.

14. The method of claim 10, further comprising forming cavities between the first contact surface and the second contact surface.

15. The method of claim 10, wherein each of the profiles of the first and second contact surfaces is embodied as substantially redundant in the axial direction.

16. The method of claim 10, wherein at least one of the first and second contact surfaces has a surface area with a surface roughness of more than 25 μm.

17. The method of claim 10, wherein the toothed rack has a cross section substantially in a shape of a trapezoid, in particular an equilateral trapezoid.

* * * * *